(12) United States Patent
Sarkar et al.

(10) Patent No.: US 11,597,080 B2
(45) Date of Patent: Mar. 7, 2023

(54) KNOWLEDGE PARTITIONING FOR TASK EXECUTION BY CONVERSATIONAL TELE-PRESENCE ROBOTS IN A GEOGRAPHICALLY SEPARATED ENVIRONMENT

(71) Applicant: Tata Consultancy Services Limited, Mumbai (IN)

(72) Inventors: Chayan Sarkar, Kolkata (IN); Snehasis Banerjee, Kolkata (IN); Pradip Pramanick, Kolkata (IN); Hrishav Bakul Barua, Kolkata (IN); Soumyadip Maity, Kolkata (IN); Dipanjan Das, Kolkata (IN); Brojeshwar Bhowmick, Kolkata (IN); Ashis Sau, Kolkata (IN); Abhijan Bhattacharyya, Kolkata (IN); Arpan Pal, Kolkata (IN); Balamuralidhar Purushothaman, Bangalore (IN); Ruddra Roy Chowdhury, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 290 days.

(21) Appl. No.: 17/015,238

(22) Filed: Sep. 9, 2020

(65) Prior Publication Data
US 2021/0291363 A1    Sep. 23, 2021

(30) Foreign Application Priority Data
Mar. 20, 2020 (IN) .............................. 202021012230

(51) Int. Cl.
*B25J 9/16* (2006.01)
*B25J 9/00* (2006.01)

(52) U.S. Cl.
CPC ............. *B25J 9/163* (2013.01); *B25J 9/0081* (2013.01); *B25J 9/1653* (2013.01); *B25J 9/1661* (2013.01); *B25J 9/1689* (2013.01)

(58) Field of Classification Search
CPC ........ B25J 9/163; B25J 9/0081; B25J 9/1653; B25J 9/1661; B25J 9/1689; B25J 9/1602;
(Continued)

(56) References Cited

U.S. PATENT DOCUMENTS

| 7,164,969 | B2 | 1/2007 | Wang et al. |
| 8,386,078 | B1* | 2/2013 | Hickman ............. G05D 1/0246 318/568.1 |
| 10,399,223 | B2 | 9/2019 | Wang et al. |
| 10,896,675 | B1* | 1/2021 | Lam ....................... G10L 15/30 |

(Continued)

OTHER PUBLICATIONS

Kyriacos Shiarlis et al., "Teresa: A Socially Intelligent Semi-autonomous Telepresence System", Workshop on Machine Learning for Social Robotics 2015—Seattle, United States, May 26, 2015, Elsevier B.V.

(Continued)

*Primary Examiner* — Abby Y Lin
*Assistant Examiner* — Dylan M Katz
(74) *Attorney, Agent, or Firm* — Finnegan, Henderson, Farabow, Garrett & Dunner LLP

(57) ABSTRACT

Conventional tele-presence robots have their own limitations with respect to task execution, information processing and management. Embodiments of the present disclosure provide a tele-presence robot (TPR) that communicates with a master device associated with a user via an edge device for task execution wherein control command from the master device is parsed for determining instructions set and task type for execution. Based on this determination, the TPR queries for information across storage devices until a response is obtained enough to execute task. The task upon execution is validated with the master device and user.

(Continued)

Knowledge acquired, during querying, task execution and validation of the executed task, is dynamically partitioned by the TPR across storage devices namely, on-board memory of the tele-present robot, an edge device, a cloud and a web interface respectively depending upon the task type, operating environment of the tele-presence robot, and other performance affecting parameters.

17 Claims, 4 Drawing Sheets

(58) Field of Classification Search
CPC .............. G05D 1/0246; G05D 1/0016; G05D 2201/0211; G05D 1/0297; G05B 2219/40146
See application file for complete search history.

(56) References Cited

U.S. PATENT DOCUMENTS

| | | | | |
|---|---|---|---|---|
| 2013/0325244 | A1* | 12/2013 | Wang .................. | G05D 1/0011 701/26 |
| 2016/0199977 | A1* | 7/2016 | Breazeal ................ | B25J 9/1694 700/246 |
| 2020/0192872 | A1* | 6/2020 | Quinn ............... | G06F 16/24568 |

OTHER PUBLICATIONS

Akansel Cosgun et al., "Incremental 3d body reconstruction framework for robotic telepresence applications incremental 3d body reconstruction framework for robotic telepresence applications utonomous Person Following for Telepresence Robots", Robo2011: The 2nd IASTED International Conference on Robotics Date: Nov. 7, 2011, ResearchBib.

Widodo Budiharto et al, "Intelligent service robot with voice recognition and telepresence capabilities", 2015 SAI Intelligent Systems Conference (IntelliSys), Nov. 10-11, 2015, IEEE.

Aleksandar Taranović et al., "Adaptable Multimodal Interaction Framework for Robot-Assisted Cognitive Training", HRI '18: Companion of the 2018 ACM/IEEE International Conference on Human-Robot Interaction, Mar. 2018, pp. 327-328, The ACM Digital Library.

Yu Fan Chen et al., "Socially Aware Motion Planning with Deep Reinforcement Learning", "2017 IEEE/RSJ International Conference on Intelligent Robots and Systems (IROS)", Sep. 24-28, 2017, IEEE.

Aniket Bera et al., "SocioSense: Robot Navigation Amongst Pedestrians with Social and Psychological Constraints", 2017 IEEE/RSJ International Conference on Intelligent Robots and Systems (IROS), Sep. 24-28, 2017, IEEE.

Photchara Ratsamee et al., "Social interactive robot navigation based on human intention analysis from face orientation and human path prediction," ROBOMECH Journal, Aug. 1, 2015, Springer Nature Switzerland AG.

Harmish Khambhaita, "Viewing Robot Navigation in Human Environment as a Cooperative Activity Title of the item: Robotics Research," Nov. 28, 2019, pp. 285-300, (SPAR, vol. 10), Springer Nature Switzerland AG.

Ashutosh Saxena et al., "RoboBrain: Large-Scale Knowledge Engine for Robots", Apr. 12, 2015, Publisher: arXiv.

* cited by examiner

KNOWLEDGE PARTITIONING FOR TASK EXECUTION BY CONVERSATIONAL TELE-PRESENCE ROBOTS IN A GEOGRAPHICALLY SEPARATED ENVIRONMENT

PRIORITY CLAIM

This U.S. patent application claims priority under 35 U.S.C. § 119 to: India Application No. 202021012230, filed on Mar. 20, 2020. The entire contents of the aforementioned application are incorporated herein by reference.

TECHNICAL FIELD

The disclosure herein generally relates to conversational tele-presence robots, and, more particularly, to knowledge partitioning for task execution by conversational tele-presence robots in a geographically separated environment.

BACKGROUND

People often are dependent on others for performing tasks. Such tasks not only consume a larger amount of time; but also cost a lot of money. There are modern systems that provide a low-cost, time-efficient alternative. Using such tools, users can perform tasks as required. However, such a setup has many limitations that can neither provide the experience nor support various activities that are possible in physical presence and environment. Assuming that there is a task being assigned for execution by a user to a modern system such as a tele-presence robot (also referred as a robot and interchangeably used hereinafter) wherein the robot is say in a first location that is different from a location (e.g., a second location) of the user. In other words, the user and robot are in a geographically separated environment. A remote participant (user) takes control of the telepresence robot from a specific location and then instructs the robot to perform a specific task. However, in order to perform such specific tasks, the tele-presence robot should have several capabilities and needs to acquire enough information to ensure that the task is executed in an efficient manner. However, given the configuration of robot, the information storage is dependent on its storage capability, processing speed, information retrieval for task execution, its ability to interact with users for completing the given task, and the like. However, tele-presence robots are not equipped with above capabilities and configurations to meet desired outcome and have their own limitations. For instance, network bandwidth is the biggest bottleneck for such a system. Even though there exists a high bandwidth network, it often becomes congested when there could be other processes that are running at the background. This not only effects a specific capability of the robot but has impact over other features and functionalities of the robot which can jeopardize the manual control of the telepresence robot from the remote side and inaccurate information processing during a task execution. Therefore, it is of utmost importance that information required is available, and enough for task execution and at the same time knowledge acquired during the task execution is effectively captured and stored for information retrieval in an effective manner for subsequent task execution. The existing methods of telepresence do not cater to the problem of handling decision making based on layers of knowledge (e.g., information processed during task execution).

SUMMARY

Embodiments of the present disclosure present technological improvements as solutions to one or more of the above-mentioned technical problems recognized by the inventors in conventional systems. For example, in one aspect, there is provided a processor implemented method for knowledge partitioning for task execution by conversational tele-presence robots in a geographically separated environment. The method comprises: obtaining by a tele-presence robot a control command via an edge device from a master device associated with a user; parsing the control command to determine a set of instructions and an associated task type to be executed; dynamically querying, by the tele-presence robot, information from at least one of a first storage device, a second storage device, a third storage device and a fourth storage device, based on the determined set of instructions and the task type, wherein the information comprises at least one of navigation information and task execution information, and wherein the at least one of the first storage device, the second storage device, the third storage device and the fourth storage device are queried (i) until a response is obtained based on the determined set of instructions and the associated task type, and (ii) based on size and amount of the information available in the at least one of the first storage device, the second storage device, the third storage device and the fourth storage device; dynamically generating, by the tele-presence robot, an execution plan based on the obtained response and executing the dynamically generated execution plan thereof, wherein the step of the dynamically generated execution plan comprises executing one or more sub tasks specific with the associated task type; upon executing of the dynamically generated execution plan, validating the executed task type; and partitioning knowledge associated with the one or more sub tasks of the executed task type and storing the partitioned knowledge in the at least one of the first storage device, the second storage device, the third storage device and the fourth storage device respectively for subsequent task execution in a seamless manner.

In an embodiment, the obtained response is stored in partial or in full in the at least one of the first storage device, the second storage device, the third storage device and the fourth storage device.

In an embodiment, the at least one of the first storage device, the second storage device, the third storage device and the fourth storage device are queried in a sequential manner for obtaining the response based on a priority flag set for each of the at least one of the first storage device, the second storage device, the third storage device and the fourth storage device.

In an embodiment, the at least one of the first storage device, the second storage device, the third storage device and the fourth storage device correspond to an on-board memory of the tele-presence robot, an edge, a cloud and a web interface respectively.

In an embodiment, the step of partitioning knowledge associated with the executed task type and storing the partitioned knowledge is based on at least one of (i) a critical value assigned to the at least one of the first storage device, the second storage device, the third storage device and the fourth storage device, (ii) a specific application associated with the task type, (iii) a domain specific to the associated task type, (iv) an environment of operating the tele-presence robot, (v) a flag variable assigned to the at least one of the first storage device, the second storage device, the third storage device and the fourth storage device, (vi) a learning pattern and (vii) an input obtained from one or more users.

In an embodiment, the learning pattern comprises at least one of (a) an adherence to (i) the critical value, (ii) the specific application associated with the task type, (iii) the domain specific to the associated task type, (iv) the environment of operating the tele-presence robot, (v) the flag variable, (b) frequency of usage of information being queried, (c), the critical value being over-ridden, (d) a response time of the at least one of the first storage device, the second storage device, the third storage device and the fourth storage device, (e) communication failure during dynamic querying of information by the tele-presence robot, (f) a probability of the communication failure during an execution of a specific task type and (g) one or more log observations associated with an execution of a specific task type.

In an embodiment, the step of executing the dynamically generated execution plan thereof comprises dynamically querying the at least one of the first storage device, the second storage device, the third storage device and the fourth storage device for further information and obtaining one or more associated responses thereof for execution of the associated task type.

In another aspect, there is provided a tele-presence robot for knowledge partitioning for task execution by conversational tele-presence robots in a geographically separated environment. The tele-presence robot comprises a memory storing instructions; one or more communication interfaces; and one or more hardware processors coupled to the memory via the one or more communication interfaces, wherein the one or more hardware processors are configured by the instructions to: obtain a control command via an edge device from a master device associated with a user; parse the control command to determine a set of instructions and an associated task type to be executed; dynamically query, information from at least one of a first storage device, a second storage device, a third storage device and a fourth storage device, based on the determined set of instructions and the task type, wherein the information comprises at least one of navigation information and task execution information, and wherein the at least one of the first storage device, the second storage device, the third storage device and the fourth storage device are queried (i) until a response is obtained based on the determined set of instructions and the associated task type, and (ii) based on size and amount of the information available in the at least one of the first storage device, the second storage device, the third storage device and the fourth storage device; dynamically generate, an execution plan based on the obtained response and executing the dynamically generated execution plan thereof, wherein the step of the dynamically generated execution plan comprises executing one or more sub tasks specific with the associated task type; upon executing of the dynamically generated execution plan, validate the executed task type; and partition knowledge associated with the one or more sub tasks of the executed task type and storing the partitioned knowledge in the at least one of the first storage device, the second storage device, the third storage device and the fourth storage device respectively for subsequent task execution in a seamless manner.

In an embodiment, the obtained response is stored in partial or in full in the at least one of the first storage device, the second storage device, the third storage device and the fourth storage device.

In an embodiment, the at least one of the first storage device, the second storage device, the third storage device and the fourth storage device are queried in a sequential manner for obtaining the response based on a priority flag set for each of the at least one of the first storage device, the second storage device, the third storage device and the fourth storage device.

In an embodiment, the at least one of the first storage device, the second storage device, the third storage device and the fourth storage device correspond to an on-board memory of the tele-presence robot, an edge, a cloud and a web interface respectively.

In an embodiment, the knowledge associated with the executed task type is partitioned and the partitioned knowledge is stored based on at least one of (i) a critical value assigned to the at least one of the first storage device, the second storage device, the third storage device and the fourth storage device, (ii) a specific application associated with the task type, (iii) a domain specific to the associated task type, (iv) an environment of operating the tele-presence robot, (v) a flag variable assigned to the at least one of the first storage device, the second storage device, the third storage device and the fourth storage device, (vi) a learning pattern and (vii) an input obtained from one or more users.

In an embodiment, the learning pattern comprises at least one of (a) an adherence to (i) the critical value, (ii) the specific application associated with the task type, (iii) the domain specific to the associated task type, (iv) the environment of operating the tele-presence robot, (v) the flag variable, (b) frequency of usage of information being queried, (c), the critical value being over-ridden, (d) a response time of the at least one of the first storage device, the second storage device, the third storage device and the fourth storage device, (e) communication failure during dynamic querying of information by the tele-presence robot, (f) a probability of the communication failure during an execution of a specific task type and (g) one or more log observations associated with an execution of a specific task type.

In an embodiment, the dynamically generated execution plan is executed by dynamically querying the at least one of the first storage device, the second storage device, the third storage device and the fourth storage device for further information and obtaining one or more associated responses thereof for execution of the associated task type.

In yet another aspect, there are provided one or more non-transitory machine-readable information storage mediums comprising one or more instructions which when executed by one or more hardware processors cause knowledge partitioning for task execution by conversational tele-presence robots in a geographically separated environment by: obtaining, via the one or more hardware processors of a tele-presence robot, a control command via an edge device from a master device associated with a user; parsing the control command to determine a set of instructions and an associated task type to be executed; dynamically querying, by the tele-presence robot, information from at least one of a first storage device, a second storage device, a third storage device and a fourth storage device, based on the determined set of instructions and the task type, wherein the information comprises at least one of navigation information and task execution information, and wherein the at least one of the first storage device, the second storage device, the third storage device and the fourth storage device are queried (i) until a response is obtained based on the determined set of instructions and the associated task type, and (ii) based on size and amount of the information available in the at least one of the first storage device, the second storage device, the third storage device and the fourth storage device; dynamically generating, by the tele-presence robot, an execution plan based on the obtained response and executing the dynamically generated execution plan thereof, wherein the step of the dynamically generated execution plan comprises executing one or more sub tasks specific with the associated task type; upon executing of the dynamically generated execution plan, validating the executed task type; and partitioning knowledge associated with the one or more sub tasks of the executed task type and storing the partitioned knowledge in the at least one of the first storage device, the second storage device, the third storage device and the fourth storage device respectively for subsequent task execution in a seamless manner.

In an embodiment, the obtained response is stored in partial or in full in the at least one of the first storage device, the second storage device, the third storage device and the fourth storage device.

In an embodiment, the at least one of the first storage device, the second storage device, the third storage device and the fourth storage device are queried in a sequential manner for obtaining the response based on a priority flag set for each of the at least one of the first storage device, the second storage device, the third storage device and the fourth storage device.

In an embodiment, the at least one of the first storage device, the second storage device, the third storage device and the fourth storage device correspond to an on-board memory of the tele-presence robot, an edge, a cloud and a web interface respectively.

In an embodiment, the step of partitioning knowledge associated with the executed task type and storing the partitioned knowledge is based on at least one of (i) a critical value assigned to the at least one of the first storage device, the second storage device, the third storage device and the fourth storage device, (ii) a specific application associated with the task type, (iii) a domain specific to the associated task type, (iv) an environment of operating the tele-presence robot, (v) a flag variable assigned to the at least one of the first storage device, the second storage device, the third storage device and the fourth storage device, (vi) a learning pattern and (vii) an input obtained from one or more users.

In an embodiment, the learning pattern comprises at least one of (a) an adherence to (i) the critical value, (ii) the specific application associated with the task type, (iii) the domain specific to the associated task type, (iv) the environment of operating the tele-presence robot, (v) the flag variable, (b) frequency of usage of information being queried, (c), the critical value being over-ridden, (d) a response time of the at least one of the first storage device, the second storage device, the third storage device and the fourth storage device, (e) communication failure during dynamic querying of information by the tele-presence robot, (f) a probability of the communication failure during an execution of a specific task type and (g) one or more log observations associated with an execution of a specific task type.

In an embodiment, the step of executing the dynamically generated execution plan thereof comprises dynamically querying the at least one of the first storage device, the second storage device, the third storage device and the fourth storage device for further information and obtaining one or more associated responses thereof for execution of the associated task type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It is to be understood that both the foregoing general description and the following detailed description are exemplary and explanatory only and are not restrictive of the invention, as claimed.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
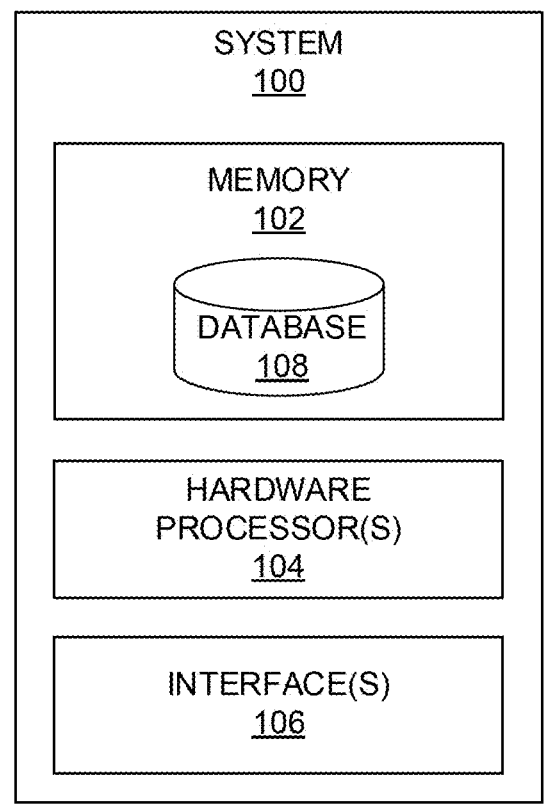
FIG. 1 depicts an exemplary block diagram of a system for knowledge partitioning for task execution by conversational tele-presence robots in a geographically separated environment, in accordance with an embodiment of the present disclosure.
Figure 2:
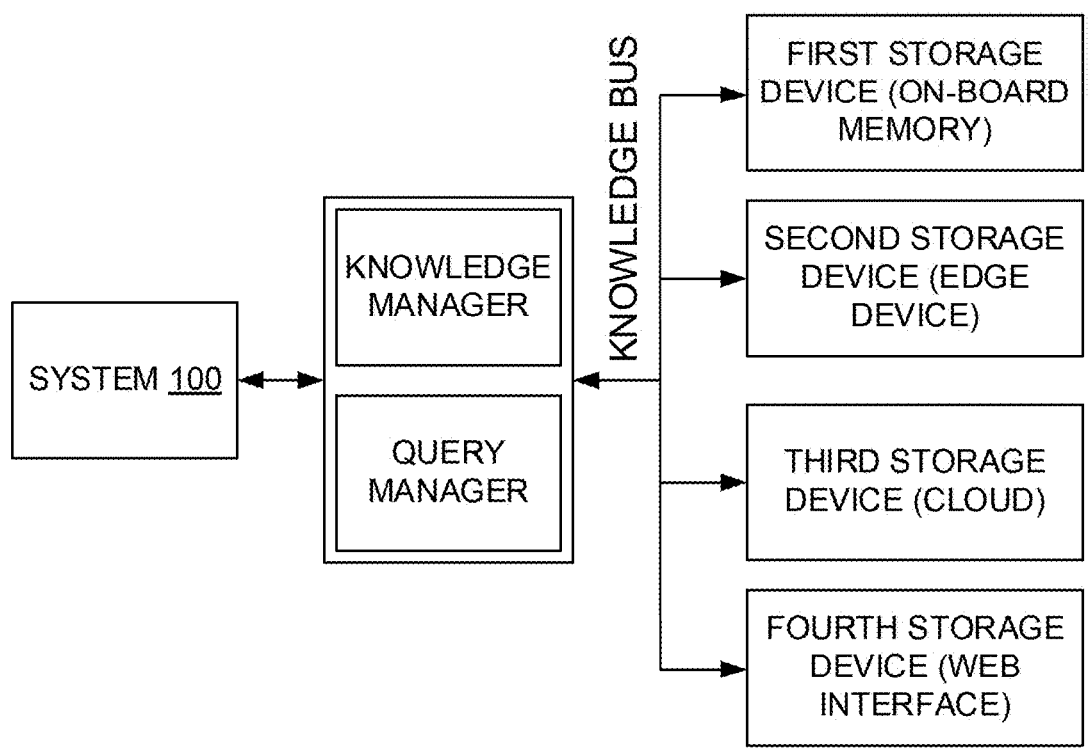
FIG. 2 depicts a block diagram illustrating an abstraction of knowledge flow across storage devices and utilization thereof by a tele-presence robot for task execution therebetween, in accordance with an embodiment of the present disclosure.
Figure 3:
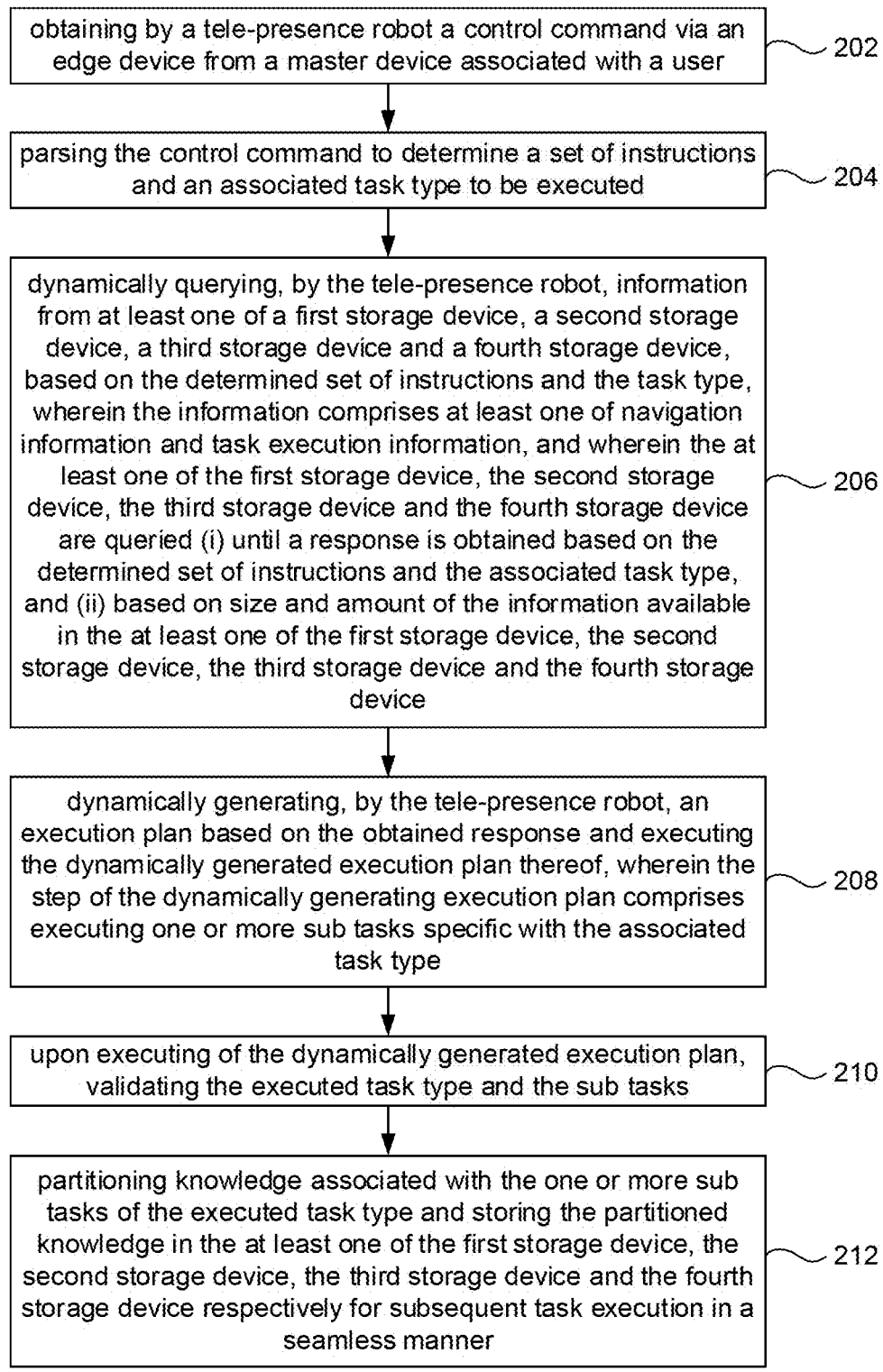
FIG. 3 depicts an exemplary flow chart for knowledge partitioning for task execution by conversational tele-presence robots in a geographically separated environment using the system of FIG. 1, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 depicts an exemplary block diagram of a system 100 for knowledge partitioning for task execution by conversational tele-presence robots in a geographically separated environment, in accordance with an embodiment of the present disclosure. The system 100 may also be referred as 'tele-presence robot', 'conversational tele-presence robot' or 'robot' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, various control command(s) (e.g., also referred as 'command(s)' and may be interchangeably used hereinafter) from a master device associated with one or more users. The master device for example, may include but not limited to a computer system, a mobile communication device, a computing device, a phone tablet, or any such computing device that is capable of provisioning audio/video/speech capabilities and is transmit information from the master device to the tele-presence robot 100 via an interface (or network e.g., say public internet), and the like. The information stored in the database 108 may further comprise parsing information wherein instructions are determined for an associated task type to be executed by the tele-presence robot, and the like. The memory 102 further comprises one or more technique(s), for instance, speech recognition technique, image processing technique, text processing technique and the like which may be known in the art techniques and implemented by the system of the present disclosure for processing various inputs received from the users from a corresponding master device. These techniques may be utilized by the either in real-time, or near real-time by the tele-presence robot. In other words, the above-mentioned techniques may be executed as applicable to perform one or more methodologies described hereinafter. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts a block diagram illustrating an abstraction of knowledge flow across storage devices and utilization thereof by the tele-presence robot for task execution therebetween, in accordance with an embodiment of the present disclosure.

FIG. 3, with reference to FIGS. 1 and 2, depicts an exemplary flow chart for knowledge partitioning for task execution by conversational tele-presence robots in a geo-graphically separated environment using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method depicted in FIG. 2 of the present disclosure will now be explained with reference to components of the system 100 of FIG. 1, the flow diagram as depicted in FIG. 3.

In an embodiment, at step 202 of the present disclosure, the tele-presence robot (or one or more hardware processors 104 of the tele-presence robot) obtain a control command via an edge device from a master device associated with a user. Communication establishment between edge device, the master device and the tele-presence robot can be realized from India patent application number 202021000342 filed on Jan. 3, 2020, patent titled "EDGE CENTRIC COMMUNICATION PROTOCOL FOR REMOTELY MANEUVERING A TELE-PRESENCE ROBOT IN A GEOGRAPHICALLY DISTRIBUTED ENVIRONMENT". Edge device as described herein refers to a device which provides an entry point into enterprise or service provider core networks. Examples include routers, routing switches, integrated access devices (IADs), multiplexers, and a variety of metropolitan area network (MAN) and wide area network (WAN) access devices as known in the art. In an embodiment, at step 204 of the present disclosure, the tele-presence robot (or one or more hardware processors 104 of the tele-presence robot) parses the control command to determine a set of instructions and an associated task type to be executed.

In an embodiment, at step 206 of the present disclosure, the tele-presence robot (or one or more hardware processors 104 of the tele-presence robot) dynamically queries information from at least one of a first storage device, a second storage device, a third storage device and a fourth storage device, based on the determined set of instructions and the task type. In an embodiment, the first storage device, the second storage device, the third storage device and the fourth storage device are queried in a sequential manner (or in parallel) for obtaining the response based on a priority flag set for each of the at least one of the first storage device, the second storage device, the third storage device and/or the fourth storage device. Sequential querying or parallel querying for information to obtain response(s) from the first storage device, the second storage device, the third storage device and/or the fourth storage device, for the task execution (including one or more sub tasks execution) may depend on capabilities and configuration of the tele-presence robot 100, in one example embodiment of the present disclosure. In an embodiment of the present disclosure, the at least one of the first storage device, the second storage device, the third storage device and the fourth storage device correspond to an on-board memory (e.g., the memory 102) of the tele-presence robot, an edge, a cloud and a web interface respectively as shown in FIG. 2.

The on-board memory of the tele-presence robot 100 may be referred as or denoted by Level 1 as depicted in FIG. 2. Here critical types of knowledge requiring instant decisions (even in time of communication failure) may be stored. This includes knowledge around environment, robot capability, local map and minimal semantics of objects expected to be detected. This depends on a use case and problem at hand. Also, as robotic telepresence system under consideration is a soft real time system, there are time bound constraints to give decisions. In case of communication failure, this level of knowledge should be good enough for the tele-presence robot to sustain its operation or come to a safe standstill till next command is given.

The edge or an edge device may be referred as or denoted by Level 2 as depicted in FIG. 2. Limited knowledge set that is frequently used (a subset of relevant knowledge) may be maintained with counters defining frequency of usage.

The cloud or back-end may be referred as or denoted by Level 3 as depicted in FIG. 2. Subset of web knowledge, relevant to use case, may be stored in a format with indexing and local caching for quick retrieval. This type of knowledge is seldom required and activated based on demand of current situation.

Figure 4:
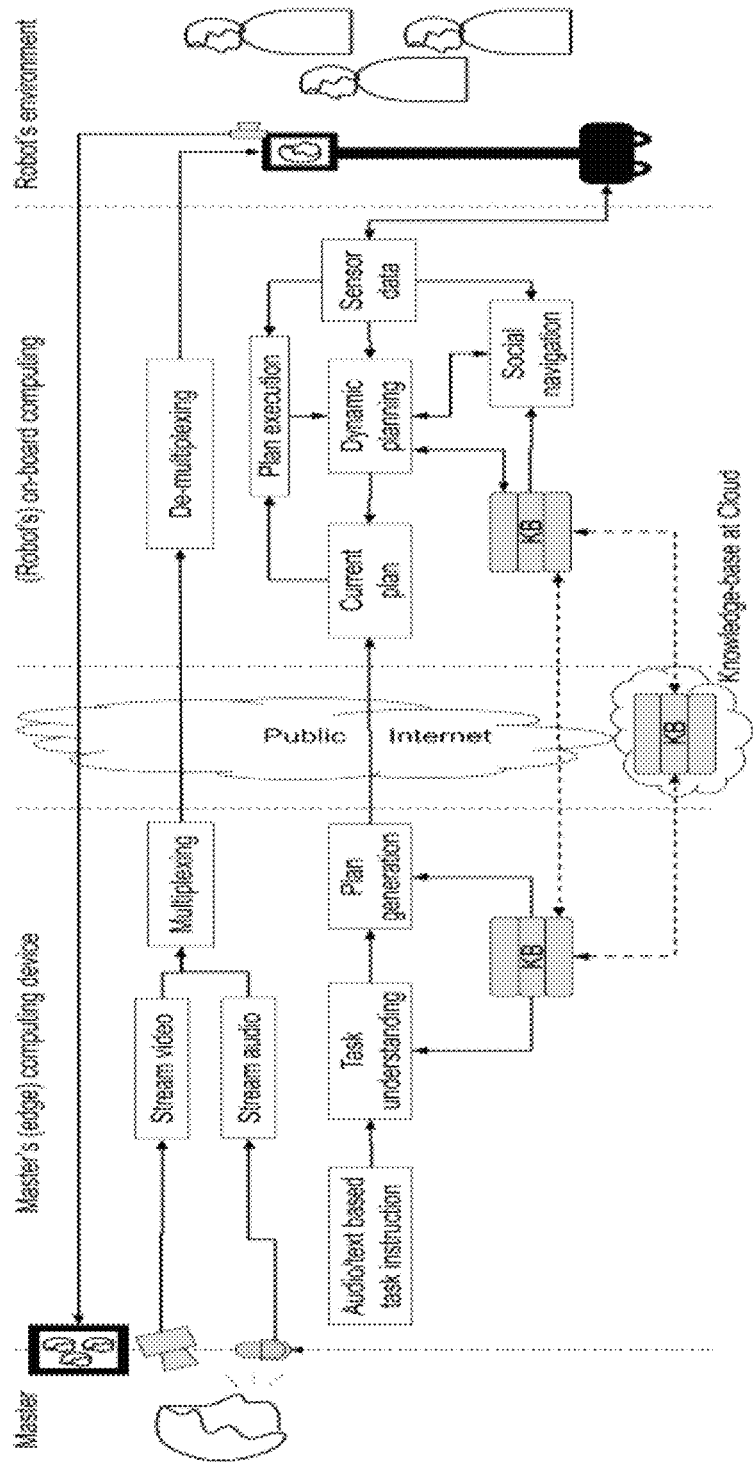
FIG. 4 depicts an exemplary tele-presence scenario illustrating communication between a user/master device and the tele-presence robot for task execution, in accordance with an embodiment of the present disclosure.

The web interface may be referred as an on-demand external access and denoted by Level 4 as depicted in FIG. 2. Knowledge is stored in triple form in various online stores like DBPedia (knowledge format of Wikipedia) which can be accessed by SPARQL endpoints as per demand of the decision-making process of knowledge processing. The amount of knowledge online is vast. Hence, this would be meaningless to store such a vast amount in local cloud. This comes into picture, when system (or the tele-presence robot 100) cannot decide even after processing all 3 levels of knowledge store/storage devices. It is to be noted, that even after accessing Level 4, the system 100 may not be able to come to a decision due to lack of desired knowledge. Then system 100 may proceed for further clarification or alternative input that can be carried out by an HRI (Human Robot Interaction) module of the system 100 (as shown in FIG. 4) wherein inputs from the user of the master device can be obtained.

The information comprises at least one of navigation information and task execution information. In an embodiment, the at least one of the first storage device, the second storage device, the third storage device and the fourth storage device are queried (i) until a response (e.g., a satisfactory response) is obtained based on the determined set of instructions and the associated task type, and (ii) based on size and amount of the information available in the at least one of the first storage device, the second storage device, the third storage device and the fourth storage device. The obtained response is stored in partial or in full in the at least one of the first storage device, the second storage device, the third storage device and the fourth storage device.

For instance, referring to FIG. 2, say "Requests" are issued for relevant knowledge to a Knowledge Manager. The knowledge manager checks for availability of relevant knowledge in the system. Next, Knowledge Manager issues queries via Query Manager checking presence of knowledge at first level and returns results. If system is unable to decide based on the knowledge supplied, the same process is repeated. Task of the Query Manager is to handle and issue queries across the different languages, especially SPARQL (SPARQL Protocol and RDF Query Language). As an example, the 'optional' filter in SPARQL enables the query manager to issue incomplete queries to get results. If results are not satisfactory for a given request, the same query is issued at the next level and so on, until satisfactory results to enable decision making is found. Each of the levels of knowledge partition has its own agent to handle queries and manage knowledge. Knowledge Manager is responsible for controlling knowledge flow via Knowledge Bus. Knowledge bus can be thought of a uniform semantic channel that enables transfer of knowledge in packet format from the knowledge store to the Knowledge Manager and finally the system. Essentially knowledge bus is a wrapper over standard communication protocols, with atomic operations of knowledge transfer. So, either all knowledge subset of queried result will be sent as a whole, or none will be sent. This is achieved by keeping an acknowledgement packet after each set of packets transferred. Knowledge Manager has a monitoring sub-module (not shown in FIGS.) whose task is to find the context of which knowledge packet is used under what context/condition/circumstance as well as frequency of usage. Cloud based stores can have a wrapper over its agent knowledge manager to enable query conversion and access to databases to bring the results in knowledge compliant format. Database wrappers can exist upon other databases such as relational databases, column stores, object-oriented database, graph database to expand the access of knowledge. In other words, the at least one of the first storage device, the second storage device, the third storage device and the fourth storage device are queried in a sequential manner for obtaining the response based on a priority flag set for each of the first storage device, the second storage device, the third storage device and/or the fourth storage device. The priority flag may be set to each of the storage devices based on context of task execution and the environment in which the robot is executing a given task.

In an embodiment, at step 208 of the present disclosure, the tele-presence robot (or one or more hardware processors 104 of the tele-presence robot) dynamically generate an execution plan based on the obtained response and executes the dynamically generated execution plan thereof. Execution of the dynamically generated execution plan may comprise executing one or more sub tasks specific with the associated task type. Assume a robot navigation scenario in which the tele-presence robot is moving in an unknown indoor environment. The robot is equipped with camera to detect objects in its area of view. If the robot encounters an object (a pattern) that it has either limited knowledge or no knowledge of, then higher level knowledge fetching is required. For example, say the robot is given a task to find where a user has left his mobile phone. Text instruction for the task is determined as say "Check where my new mobile phone is" based on an input control command. The user is currently not at the location and interacting with robot remotely (which defines that the task execution is performed for geographically separated environment). For instance, user who has assigned a task to the robot may be in a first location (e.g., in a garden) and the robot is performing a task that requires it to navigate and execute the task (e.g., finding a mobile device present in a living room or a bed room). Above example of task execution may be better understood by the following description by way of non-construing example:

For instance, say the control command provided by the user is parsed as Text Instruction T namely "Check where my new mobile phone is" and this instruction can have different variations. It is assumed that a text to goal translator takes care of language ambiguity and find the goals correctly. Now, the text instruction T is converted to a goal G to find an object of type mobile phone belonging to the user. The goal G may be as follows:

(task find object) (object type mobile) (object usedBy user)

The system/robot 100 has an option of asking the user more questions if access to knowledge is broken (communication failure at some level) or too ambiguous to form a knowledge accessing query. In this case, the robot through its camera sensor can identify the person and relate to earlier taken images of the person with the target mobile phone to list down the phone characteristics. Suppose the user uses a mobile communication device say iPhone® (e.g., iPhone® 10). This phone model information has to be in a database of some sort; if not it needs to be supplied by the user in the instruction itself like "Check where my iPhone® 10 is". Now upon identifying the target object as a phone, the system/robot starts to search its current view for a pattern for that object.

(task find object) (object type mobile) (object usedby userA) (object modelType 'iPhone® 10')

Patterns for commonly occurring indoor objects are stored in a model for pattern recognition in the robot carry on software. This may also include co-occurrence probabilities learned from object identification after processing a corpus of large number of indoor images (using the image processing technique comprised in the memory 102). This may look like:

(object1 isCoLocatedWith object2 probability-value)
An instance may look like:
(marker_pen isCoLocatedWith duster 0.98)
Additional information that is comprised in the database may include:
(object hasImageURL Link)
An instance may look like:
(marker_pen hasImageURL file://images/marker1.jpg)

This knowledge should be restricted to usually occurring elements in the current environment and application. The subset knowledge to reside on board is fetched by querying indoor ontology residing on the edge or cloud. The subset retrieval queries may be for example, "select * from indoor-ontology where environment='office' and application='telepresence'".

However, unexpected and new patterns (when probability values are low for a stored object class) are required for accessing external models (located elsewhere) for future inference.

Also, in case, when synonyms or local abbreviations or dialects of objects are mentioned in instruction, but in the memory 102 something else is stored, in such a case it is required to use the 'sameAs' relationship between similar meaning words to convert this into the target object word that is stored in a knowledge graph.

For example, the robot locates an object 'parcel' tagged "XYZ Parcel" which is not generally found in office environments. This may be a scenario when someone (e.g., office staff/associate) has left it after taking delivery at office address. In such a scenario, to gain needed knowledge around the found object 'parcel', the system 100 needs to enquire the cloud with the keyword (e.g., say 'parcel' or 'XYZ parcel) as knowledge is missing in on-board storage device as well as edge device as this keyword or information querying for task execution was an unexpected entry. The queries are formulated on the fly using SPARQL to fetch necessary details around the target object in scene. It is to be noted that template queries are stored in the system 100 and the objects act as variables that bring in specific details around the target object. An example template pattern in simple form is Select likelihood of target_object coLocatedWith object_in_scene This query is carried out until response is fetched from on-board, edge, cloud, web interface in that order. If no response if fetched even from web knowledge endpoint, then system 100 triggers for new entry and logs the object for human intervention later (wherein user may provide his/her inputs that can be used for subsequent processing and task execution). The user can also update knowledge of unknown object through a user interface associated with the system 100 or an application running on the master device, which help be useful when similar object comes into viewing scene. The application may be native application (which may act as a master application or a client application) comprised in the master device that can be used to control and monitor task execution(s) of the tele-presence robot. The same application may be present in the robot which may act as a master application or a client application as applicable. For instance, a master application may have several other modules and features that the robot may utilize for task execution and partitioning of knowledge whereas the client application is similar to the master application having similar features and modules (however some of the modules and features may not be available to the master device and can only be used by the robot). The master application and the client application may update information based on one or more inputs (that may come from the tele-presence robot, or by user(s)) in real-time or near real-time.

Other information that can be fetched depends on application and environment. Some template queries of different scenarios in simple form:

Select sample_images where environment='indoor' and object=target_object

Select height_location of where object=target_object {Optional environment='indoor'}

Select width, depth, height where object=target_object

The robot continues to move until target object pattern (in this case mobile phone) is found by computer vision processing system by object detection algorithms. These computer vision processing system and object detection algorithms are comprised in the tele-presence robot and executed during task execution. Based on the current environment setting and location, the probable places (zones as well as estimated region heights) to look for the phone object can be retrieved from the knowledge store at Level 2 (edge device) that makes the vision based search quick and guided.

As mentioned earlier, the edge storage has knowledge of probabilities of occurrence of different objects at different layouts and environment settings. Now, once a phone like object is detected at a region, whether the phone model is the same as the current one in sight needs validation. For that, images of the phone model are retrieved from web (if cached versions do not exist in local cloud) so that the vision system can compare with specific model image with what is in sight. This can be done by issuing semantic queries first at cloud, next at web endpoint:

select image_url from image_database where object=target_object and object_property_model='10' and object_property_name='iPhone®'

There is a wrapper service tied to a search engine to retrieve image patterns related to keyword of search, in case knowledge base queries fail to yield results. Disambiguation of results is performed by semantic closeness of target object with yielded results through distance measures.

While executing the above task comprising one or more sub-tasks, say the tele-presence robot 100 needs to execute several steps. For instance, while executing say step 0 of the above plan, the tele-presence robot 100 may perform dynamic planning as well as social navigation planning. As mentioned above, if the tele-presence robot 100 finds an obstacle and decides that it is not possible to reach the given location using the current path plan, it finds an alternate path plan to reach location. For example, the current location is <6, 1> and the destination location is <8, 1> and the current path planning says go to <7, 1> and then to <8, 1>. But, if there is an obstacle at location <7, 1>, the tele-presence robot 100 needs to find an alternate (may be more costly in terms of distance) path through <6, 1> <6, 2> <7, 2> <8, 2> <8, 1>. Alternatively, since there could be further steps in the high-level plan (step 1 to 3), the tele-presence robot 100 may continue step 1 and 2 just after reaching location <8, 2>. Thus, the step 0 can be modified accordingly. Also, if it is felt that there is a human being (at location <7, 1>) who moves out from the tele-presence robot's path, the tele-presence robot 100 may continue with the initial path without re-planning. This depends, what is distance from the obstacle, the tele-presence robot 100 accordingly identifies the obstacle on its way and then clears path due to moving of the human being. In other words, the dynamic path planning and social navigation is based on during an execution of the task may be based on motions of one or more object(s) (e.g., other standstill and movable objects), one or more user(s) and one or more obstacles being predicted during the execution. Such prediction by the tele-presence robot 100 is performed in real-time based on sensory information received by the tele-presence robot from one or more sensing devices (wherein the sensing devices are either integral part of the tele-presence robot or are deployed in the environment where the task execution is performed by the tele-presence robot 100). The above description of dynamic path planning and social navigation can be better understood by way of following example:

When a robot starts navigation based on a (initial) path plan, the dynamic planning and social navigation module may start in parallel. The robot's obstacle avoidance sensor(s) (integral to the robot 100) continuously monitors any obstacle on its planned path as well as within the close vicinity of the path. The close vicinity is defined based on a pre-defined threshold. The pre-defined threshold depends on the robotic hardware, (e.g., its reaction time to avoid any collision). If any new/dynamic obstacle is detected that were not part of the map, the robot checks if the obstacle within its vicinity is on its path, i.e., whether direct collision is going to happen or not. If not on path and a non-human obstacle, the robot continues its current plan. If on path and a non-human static obstacle, the dynamic path planning is initiated with minimal deviation from the initial path. If a human being is detected, first the trajectory of the human being is decided. Based on the trajectory, the probable collision point is identified. Then the robot can either adjusts its speed, stop momentarily, or deviate from the current path to avoid the collision.

Next, step is to validate whether the phone is of that specific user issuing the command. This can be done by either some specified identifier on phone body or better by calling the number of the phone (requiring additional system capability) and checking if phone rings or shows some signal (even if it is in silent mode). If phone is switched off, only visual cues can be useful. Now to get the user's phone number to call, this can be done by asking the user directly or fetching the knowledge from the store/respective storage device, which can be in local cloud usually in protected mode with due permission granted from user. Additional information around the phone once spotted can be queried from the cloud as well as web, which is in a way a kind of add-on user experience such as "Do you want to install an app named Find My Phone?". The knowledge that "Find My Phone" is an app to find and locate iPhone®, can be fetched from the external knowledge store (typically large knowledge stores like DBpedia, which is the knowledge format of Wikipedia) by querying extra information about "iPhone®" and "find location" together and getting triples with the facts matching the query. If no such facts exist, there will be no add-on user experience. So, such validation may require querying other storage devices and/or obtaining inputs from the user of the master device for validating the task being executed. In other words, at step 210 of the present disclosure, the tele-presence robot upon executing of the dynamically generated execution plan, performs validation of the executed task type as mentioned above.

In addition to the above, it is to be noted that the system (or the tele-presence robot 100) handles knowledge in terms of Knowledge Packet, as mentioned earlier. Now in this scenario, knowledge of robot is partitioned based on need of application. As an example, knowledge around dimensions of robot needed for safe navigation is kept on board. The navigation map, if available is kept at edge device. Now, whether local map or global map resides there depends on size of navigation map and space limitations of edge device. For large navigation spaces, cloud may be a suitable place to store the information and local sections of map gets retrieved as per task demands. The last level—the web interface is to gather unexpected knowledge requirements. This type of partitioning can happen in real-time during task execution or post task execution and validation of the task type. For instance, in a specific task, say the task is split into various sub-tasks. During execution of each sub-task, the tele-presence robot 100 is configured to make dynamic decisions as to whether information pertaining to a particular sub-task needs to be stored in the on-board memory of the tele-presence robot, an edge, a cloud and/or a web interface. For instance, sub-task execution information may comprise of knowledge such as task type, navigational map information utilized during the sub-task execution, information on interaction of the tele-presence robot with the master device/user, one or more obstacles encountered by the may be tele-presence robot during the sub-task execution, time taken by the tele-presence robot to execute the sub-task, environment type associated with the sub-task execution (e.g., whether it was an indoor environment or an outdoor environment), an associated context (e.g., say 'finding the phone') and the like. In such scenarios, navigational map information utilized during the sub-task execution and execution plan may be partitioned and stored in the on-board memory of the tele-presence robot depending upon size and availability of memory space from the on-board memory of the tele-presence. Information on interaction of the tele-presence robot with the master device/user may be stored on the edge device. The one or more obstacles encountered by the tele-presence robot during the sub-task execution may be captured in the form or images, videos or any other multimedia content type and stored in the cloud. Time taken by the tele-presence robot to execute the sub-task, environment type associated with the sub-task execution (e.g., whether it was an indoor environment or an outdoor environment), an associated context (e.g., say 'finding the phone') may be stored in a web interface by the tele-presence robot. It is to be understood by a person having ordinary skill in the art or person skilled in the art that the tele-presence robot 100 performs partitioning of the above knowledge to overcome any overhead in memory management of the at least one of the first storage device, the second storage device, the third storage device and the fourth storage device (e.g., the on-board memory of the tele-presence robot, the edge (or edge device), the cloud and the web interface respectively). In other words, at step 212 of the present disclosure, the tele-presence robot 100 performs partitioning of knowledge associated with the one or more sub tasks of the executed task type and stores the partitioned knowledge in the at least one of the first storage device, the second storage device, the third storage device and the fourth storage device respectively for subsequent task execution in a seamless manner.

It is to be understood by a person having ordinary skill in the art or person skilled in the art that a robot (e.g., the tele-presence robot 100 also referred as 'robot' and may be interchangeably used hereinafter) may be a soft real-time system. In emergency situations, the robot needs to decide with limited knowledge residing on its main system (not requiring external communication). This is because accessing external knowledge has a latency cost and it is not possible to have the entire knowledge residing in embedded system due to (a) space limitations (b) processing time over large amounts of knowledge. Knowledge should be accessed on demand. In other scenarios, decision making by robot may be given more time based on type of resultant action and relaxation level of time constraints. More specifically, the knowledge partitioning is done in such a way that information retrieval is seamless and memory management across the on-board memory of the tele-presence robot, the edge (or edge device), the cloud and the web interface is optimized.

Further, though the steps 208, 210 and 212 are performed in a sequential manner, it is to be understood by a person having ordinary skill in the art or person skilled in the art that task execution plan may be generated on the fly or dynamically as and when the tele-presence robot 100 determines that it has received a satisfactory response for information being queried across storage devices. In other words, task execution plan may be generated in parallel if the tele-presence robot 100 feels that it has received a satisfactory response for information being queried across storage devices. Similarly, the execution can happen in parallel as and when the task execution plan is generated and updated with subsequent steps or sub-tasks to be executed. Similarly, even the validation of task execution can happen in parallel. For instance, if a task has say 4 sub-tasks, upon completion of a first sub-task, the tele-presence robot 100 can (i) either wait for performing validation of the first sub-task until all the 4 sub-tasks are executed or (ii) perform validation of the first sub-task (using one or more external inputs or by performing self-validation) and in parallel continue to execute the remaining sub-tasks (e.g., in this case second sub-task, third sub-task and the fourth sub-task). The validation may include comparing task executed by the tele-presence robot with an actual task execution reference template (which is either stored in the memory 102 or provided by the user 102 or the master device). For instance, say task A is to be executed with series of steps say X1, X2, X3 and Xn. If the tele-presence robot has performed the task in the above series of steps than the validation is flagged as successful. If there is a deviation during the task execution when compared to actual steps to be carried out (based on reference template) and has resulted in more time and utilization of processing capabilities, then the tele-presence robot can learn from this comparison and reduce it to practice in the future for similar tasks or near-similar tasks. Such deviations can either be reported through (i) automated comparison of task executed with a task execution reference template, or (ii) inputs provided by the user via the master device upon reviewing the task execution of the tele-presence robot 100 and its status. The reference template may include task type, sub-task type, information required to perform specific sub-task type/task type, time to be taken by the tele-presence robot for accomplishing a specific sub-task type/task type, and the like. The information required to perform specific sub-task type/task type may include path planning and local map information for navigation. Upon execution of the task by the tele-presence robot 100, a task execution report/summary may be generated by the robot 100. This task execution report/summary may include task executed, sub-task status, amount of information queried, frequency of information queried, time taken by the robot to accomplish task(s)/sub-task, resources utilized by the tele-presence robot (e.g., sensors, storage devices, etc.), information on knowledge partitioned, and the like. The details from the task execution report/summary are (or may be) compared with details/information comprised in the reference template (e.g., task execution reference template) to validate the task execution. The comparison can either be performed by the tele-presence robot 100 or may be performed transmitting the task execution report/summary to the master device via the edge device wherein the task execution report/summary is compared with actual task execution details to assess activities performed by the tele-present robot. Post assessment, an analytical report of performance of the tele-presence robot 100 may be shared by the master device to the robot 100 wherein the robot 100 can analyse for any deviation from task execution that may be caused delay. This analysis helps the robot 100 to self-learn and improvise for similar (or near similar) task execution in the future.

Moreover, the step of 212 which is partitioning knowledge can also be performed in parallel. For instance, considering the above scenario of the task having 4 sub-tasks. Say, the tele-presence robot 100 has completed executing the first sub-task. If the tele-presence robot 100 determines that the information of the first sub-task is sufficient for partitioning then the tele-presence robot 100 performs partitioning by storing information relating to the first sub-task, in partial or in full, into at least one of the first storage device, the second storage device, the third storage device and the fourth storage device. For instance, the information pertaining to the first sub-task may be either stored in only one storage device or in more than one storage device. This sort of partitioning the knowledge/information of the first sub-task may be either based on the task type, execution type, a critical value assigned to the at least one of the first storage device, the second storage device, the third storage device and the fourth storage device, a specific application associated with the task type/the first sub-task, a domain specific to the associated task type/the first sub-task, an environment of operating the tele-presence robot, a flag variable assigned to the at least one of the first storage device, the second storage device, the third storage device and the fourth storage device, a learning pattern and an input obtained from one or more users and the like. In another embodiment, the tele-presence robot 100 may perform partitioning after second sub-task is executed. In yet another embodiment, the tele-presence robot 100 may perform partitioning after third sub-task is executed. In a further embodiment, the tele-presence robot 100 may perform partitioning after all the sub-tasks are executed.

The critical value as assigned to the knowledge blocks (or partitioned knowledge) at different levels may be based on what is the essential knowledge that needs to exist based on the expert guidance supplied by domain experts. In general, critical value corresponds to the level number of knowledge partition. Similarly, specific application is tagged to a task type. Most of the times, it is found that the knowledge required is dependent on the specific application, hence based on current application mode, knowledge needs to be stored accordingly. Similarly, domain is tagged to a task type wherein domain plays an important role in knowledge-based decision making. Domain specific knowledge is usually stored in ontologies with instances of real-world facts. Based on current domain in use, the tele-presence robot 100 automatically selects one or more ontologies with relevant domain tag. Usually ontologies have connections to other ontologies. Hence, while domain ontology is expected to be given higher priority (usually on-board), the ontologies having close relations with the current domain ontologies need to be kept at the next level (usually edge). Further, operating environment is also tagged to the task type. For instance, contextual knowledge of the environment plays an important role in managing the domain knowledge. In case of tele-presence navigation, semantic maps play an important role along with physical maps of point clouds. Based on the environment, where the tele-presence robot is left to operate, the corresponding map needs to be loaded as it is highly critical if communication to edge fails at some point of time.

Further, a flag may be tagged to a partitioned knowledge. For instance, there can be additional parameters based on which logic behind knowledge partitioning can be based. As a design choice, a flag variable may be kept for future use. It is to be noted that the flag variable may not be necessarily of Boolean type. Example usage of a flag variable and their interpretation are values of '00', '01', '10' respectively referring to semantic states of low, mid and high levels of robot's onboard battery state. This can be used to determine if the power consumption due to communication overhead is justified to fetch the knowledge packet (or also referred as data/packet or information and interchangeably used hereinafter) with regards to its current battery state.

Further, learning pattern may be tagged to partitioned knowledge. For example, the Knowledge Manager monitors and checks the adherence to the values in the logics mentioned above and updates the same based on frequency of usage, whether values are actually over-ridden, response time of the levels of knowledge partition, probability of communication failures in current context. The log observations are stored in an online learning model comprised in the memory 102, based on which decision can be taken at each of the earlier cases. In other words, the learning pattern comprises at least one of (a) an adherence to (i) the critical value, (ii) the specific application associated with the task type, (iii) the domain specific to the associated task type, (iv) the environment of operating the tele-presence robot, (v) the flag variable, (b) frequency of usage of information being queried, (c), the critical value being over-ridden, (d) a response time of the at least one of the first storage device, the second storage device, the third storage device and the fourth storage device, (e) communication failure during dynamic querying of information by the tele-presence robot, (f) a probability of the communication failure during an execution of a specific task type and (g) one or more log observations associated with an execution of a specific task type. In an embodiment of the present disclosure, the task type, operating environment, critical value, application type, domain type, flag variable, frequency of usage of information queried, over-ridden critical values, response time of storage device to provide response to specific queries, communication failure and probability thereof, log observation(s) and the like may be referred as performance affecting parameters associated with the tele-presence robot. Example of frequency of usage pertain to those knowledge packets that are related to indoor object relations if the current situation is in an indoor environment. Example of communication failure probability coming into use is when the current location of robot is in a network jammed location and when the packet size (size of information being queried or exchanged from and to the system 100 and the one or more storage device(s)) is large and the source store bandwidth is low. The channel of communication and its bandwidth also contributes to decision making. Knowledge stores (also referred as storage device(s) such as the first storage device, the second storage device, the third storage device and the fourth storage device) has physical devices that has their own response times in addition to the algorithm time complexity in terms of searching and querying. An additional time factor is that of the communication channel and network distance of robot from the knowledge source/storage device. As an example, a task needing local information like semantic details of a known object detected by camera can be done quickly. However, a task needing knowledge of an unknown object detected by a robot sensor (say camera) that needs to be clarified in the first case needs more processing time as it requires searching external knowledge stores (e.g., cloud or web interface type storage device) that may have (or has) inherent latency. Critical values of knowledge packets can be overridden in case a combination of tasks are themselves assigned high priority. This can occur in emergency scenarios of an application—in such cases corresponding knowledge packets are granted temporary higher critical values even if other tasks in other robot(s) are also using the shared knowledge level accesses.

It is to be understood by a person having ordinary skill in the art and a person skilled in the art that sometimes, systems such as tele-presence robots (e.g., tele-presence robot 100) cannot learn properly in unexpected scenarios, yet the system is expected to operate intelligently. Also there exists a cold start problem, where without any prior observations, the system cannot learn. Sometimes, biases in learning may creep in where one parameter is given unexpectedly higher priority over another. The bias can come when training happens only on some repeated and similar use cases. To overcome this, the system has a scope of manual intervention, wherein an expert can over-ride the values in the knowledge packet to enable allocation of knowledge to different levels of storage. More weighted favor can be given for task types where training was less compared to other major task types or generic task types. However, if the estimated usage in 'n' tasks is represented more or less by a Bayesian approximation of the distribution of tasks (e.g., Bayesian approximation as known in the art), then criticality values can be automatically adjusted based on Bayesian inferencing.

Below is a table (Table 1) depicting an example knowledge packet with corresponding tags assigned to it during or after partitioning of the knowledge:

TABLE 1

| ID | Critical Value | Application ID | Domain ID | Environment ID | Flag |
|----|----------------|----------------|-----------|----------------|------|
| 2  | 1              | 2              | 4         | 13             | X    |
| 5  | 2              | 2              | 6         | 56             | X    |
| 17 | 4              | 5              | 2         | 34             | X    |

In the above table 1, IDs indicate unique identifiers allotted to knowledge packets (e.g., information queried or response received from storage device(s)) which helps in gathering analytical information with reference to an ID. Critical values are assigned based on whether tasks are atomic tasks which are frequently used (for example, atomic task may include motion tasks of robots in certain directions), generic tasks that are required for robot's general activity (like those knowledge packets associated with obstacle avoidance, battery charging and point to point path planning tasks) and the like. This can be learnt by monitoring the access records of knowledge packets (e.g., wherein the monitoring can either happening by the system 100 or by an external entity) when large number of tasks have been executed. Initially, knowledge packets are assigned critical values tied to their numeric value of knowledge level. Application IDs are references to actual usage of knowledge in certain application use cases. As an example, if current application is "robot needs to follow a person", then knowledge packets with person identification, social distance monitoring and person trajectory estimation becomes important and assigned an application ID for preferential loading. Domain IDs similarly work for domains under consideration. Environment ID is assigned when the robot through its sensor can detect or estimate current scene and fetches a matching ID from a record of environments. Flag(s) is/are assigned based on developer level necessity and kept open for developer's judgement of expressing logical decision making at the knowledge layers (at various levels of storage devices).

FIG. 4, with reference to FIGS. 1 through 3, depicts an exemplary tele-presence scenario illustrating communication between a user/master device and the tele-presence robot for task execution, in accordance with an embodiment of the present disclosure. More specifically, in FIG. 4, user (also referred as 'master' and interchangeably used hereinafter) associated with the master device can be at a remote location giving instructions to the tele-presence robot 100. Instruction can be in form of typed text, audio, video, or combinations thereof. At both ends of the tele-presence robot 100, display screen, camera and microphone are available. From the master end, the robot environment can be perceived in display screen. Audio and video feeds are streamed both ways over desired communication channel (based on bandwidth availability). In case of communication issues or by choice, a user may opt to be represented on the other end's display screen as an avatar. Task instruction(s) is/are analyzed with the help of knowledge base (KB) (also referred as 'knowledge store' comprised in a database) to generate plans. Location of KB can be on robot's end, master's end, onboard or on a cloud that can be private or public as per requirement. The robot uses its sensor perception to analyse scenes to identify obstacles, moving humans, landmark locations, and the like. To achieve its goal (derived from user instruction), it performs dynamic planning on the fly to move from one location to another. Given a goal, the robot navigates to achieve its sub goals which is based on motion planning, path planning, social navigation, or combinations thereof. It is to be noted that master end can also be serviced by a tele presence robot, in one embodiment of the present disclosure.

Though the present disclosure embodiments of the system and method is explained with reference to an example, find my phone, it is to be understood by a person having ordinary skill in the art and person skilled in the art that the present disclosure and its systems and methods can be implemented for any task execution type and such example as described herein shall not be construed as limiting the scope of the present disclosure. The same methodology can be applied in scenarios where the number of applications running on a robot is dependent on various levels and variety of knowledge. As an example, for execution of a telepresence scenario in space to earth communication setting, it becomes important to keep the important knowledge packets on board memory of the tele-presence robot 100 with reference to identifiers of knowledge invoked by task executions. A task namely "make temperature of space craft same as city C" needs knowledge of city C's temperature that requires to be queried from the earth sensor directly (that takes time) or can re-use archived records of weather data stored in edge level at space craft in anticipation of such queries or temporary communication failure. If queries are new, the system/robot 100 can learn what to keep where in the next edition of space expedition.

Further, the tele-presence robot 100 is configured to self-learn based on information being queried, tasks executed, tasks validated, and knowledge partitioned across storage devices. This self-learning capability may further enable the tele-presence robot to update information/knowledge that is already partitioned. In other words, the self-learning capabilities of the tele-presence robot 100 may further enable the robot 100 to take correct and/or appropriate measures in partitioning for any subsequent tasks being assigned for execution. Such correct and/or appropriate measures may also include making suitable correction in the already partitioned knowledge. For instance, based on the performance affecting parameters, the tele-presence robot 100 may retrieve specific knowledge (e.g., response time and response associated with queried information) from one storage device (e.g., web interface) and store the retrieved knowledge into another storage device (e.g., say on-board memory or edge device). For instance, the tele-presence robot 100 during its one of the previous task execution would have learnt that information retrieved and/or obtained from a specific storage was slow and thereby resulted in communication failure during the interaction with that specific storage (e.g., say web interface where associated server was under maintenance). This learning is utilized by the tele-presence robot 100 that helps transfer of the already partitioned knowledge from one storage device (e.g., web interface) into other storage device(s) (e.g., edge device or on-board member). By processing such transfers and utilizing the learnt knowledge, faster and efficient way of information retrieval and processing may be achieved for task execution for subsequent tasks at hand thus saving time, cost, processing speed of devices, and optimizing resources of the tele-presence robot itself. Such learning and intelligent decisions by the tele-presence robot may be achieved by deployed and executing machine learning models and/or artificial intelligence modules/systems into the tele-presence robot 100.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

obtaining, by a tele-presence robot, a control command via an edge device from a master device associated with a user;

parsing, by the tele-presence robot, the control command to determine a set of instructions and an associated task type to be executed;

dynamically querying, by the tele-presence robot, information from a first storage device, a second storage device, a third storage device, and a fourth storage device, wherein the dynamically querying of the information is based on the determined set of instructions and the associated task type, the information comprises at least one of navigation information and task execution information, and each of the first storage device, the second storage device, the third storage device, and the fourth storage device are sequentially queried further based on:

a response that is obtained from at least one of the first storage device, the second storage device, the third storage device, and the fourth storage device an amount of the information that is available in each of the first storage device, the second storage device, the third storage device, and the fourth storage device, a priority flag set for each of the first storage device, the second storage device, the third storage device, and the fourth storage device, and the priority flag is set to each of the first storage device, the second storage device, the third storage device, and the fourth storage device, based on context of task execution of the associated task type and an environment in which the tele-presence robot is executing a given task of the associated task type;

dynamically generating, by the tele-presence robot, an execution plan based on the obtained response and executing the dynamically generated execution plan wherein the dynamically generated execution plan comprises executing one or more sub tasks specific with the associated task type;

upon the execution of the dynamically generated execution plan, validating the executed one or more sub tasks; and partitioning knowledge associated with the executed one or more sub tasks and storing the partitioned knowledge in at least one of the first storage device, the second storage device, the third storage device, and the fourth storage device respectively for subsequent task execution, wherein the partitioning of the knowledge and the storing of the partitioned knowledge is based on:

a critical value assigned to at least one of the first storage device, the second storage device, the third storage device, and the fourth storage device, wherein the critical value indicates level of the partitioned knowledge, a domain of the associated task type, and a flag variable assigned to each of the first storage device, the second storage device, the third storage device, and the fourth storage device, wherein the flag variable indicates a battery status of each of the first storage device, the second storage device, the third storage device, and the fourth storage device.

2. The processor implemented method as claimed in claim 1, wherein the obtained response is stored in partial or in full in at least one of the first storage device, the second storage device, the third storage device, and the fourth storage device.

3. The processor implemented method as claimed in claim 1, wherein at least one of the first storage device, the second storage device, the third storage device, and the fourth storage device correspond to an on-board memory of the tele-presence robot, the edge device, a cloud server, and a web interface respectively.

4. The processor implemented method as claimed in claim 1, wherein the step of partitioning knowledge associated with the executed task type and storing the partitioned knowledge is further based on at least one of (i) a specific application associated with the task type, (ii) an environment of operating the tele-presence robot (iii) a learning pattern, and (iv) an input obtained from one or more users.

5. The processor implemented method as claimed in claim 4, wherein the learning pattern comprises:
   (a) an adherence to (i) the critical value, (ii) the specific application associated with the associated task type, (iii) the domain of the associated task type, (iv) the environment of operating the tele-presence robot, (v) the flag variable,
   (b) a frequency of usage of the information being queried,
   (c) the critical value being over-ridden,
   (d) a response time of at least one of the first storage device, the second storage device, the third storage device, and the fourth storage device,
   (e) a communication failure during dynamic querying of information by the tele-presence robot,
   (f) a probability of the communication failure during an execution of a specific task type of the associated task type, and
   (g) one or more log observations associated with an execution of the specific task type.

6. The processor implemented method as claimed in claim 1, wherein the execution of the dynamically generated execution plan further comprises:
   dynamically querying at least one of the first storage device, the second storage device, the third storage device, and the fourth storage device for further information; and
   obtaining one or more associated responses for the execution of the one or more sub tasks.

7. A tele-presence robot, comprising:
   a memory storing instructions;
   one or more communication interfaces; and
   one or more hardware processors coupled to the memory via the one or more communication interfaces, wherein the one or more hardware processors are configured by the instructions to:
      obtain a control command via an edge device from a master device associated with a user;
      parse the control command to determine a set of instructions and an associated task type to be executed;
      dynamically query information from a first storage device, a second storage device, a third storage device, and a fourth storage device, wherein
         the dynamically querying of the information is based on the determined set of instructions and the associated task type, wherein
         the information comprises at least one of navigation information and task execution information, and
         each of the first storage device, the second storage device, the third storage device, and the fourth storage device are sequentially queried further based on:
            a response that is obtained from at least one of the first storage device, the second storage device, the third storage device, and the fourth storage device,
            an amount of the information that is available in each of the first storage device, the second storage device, the third storage device and the fourth storage device,
            a priority flag set for each of the first storage device, the second storage device, the third storage device, and the fourth storage device, and
            the priority flag is set to each of the first storage device, the second storage device, the third storage device, and the fourth storage device, based on context of task execution of the associated task type and an environment in which the tele-presence robot is executing a given task of the associated task type;
      dynamically generate an execution plan based on the obtained response and executing the dynamically generated execution plan, wherein the dynamically generated execution plan comprises executing one or more sub tasks specific with the associated task type;
      upon the execution of the dynamically generated execution plan, validate the executed one or more sub tasks; and
      partition knowledge associated with the executed one or more sub tasks and storing the partitioned knowledge in at least one of the first storage device, the second storage device, the third storage device and the fourth storage device respectively for subsequent task execution, wherein the partitioning of the knowledge and the storing of the partitioned knowledge is based on:
         a critical value assigned to at least one of the first storage device, the second storage device, the third storage device, and the fourth storage device, wherein the critical value indicates level of the partitioned knowledge,
         a domain of the associated task type, and
         a flag variable assigned to each of the first storage device, the second storage device, the third storage device, and the fourth storage device, wherein the flag variable indicates a battery status of each of the first storage device, the second storage device, the third storage device, and the fourth storage device.

8. The tele-presence robot as claimed in claim 7, wherein the obtained response is stored in partial or in full in at least one of the first storage device, the second storage device, the third storage device, and the fourth storage device.

9. The tele-presence robot as claimed in claim 7, wherein at least one of the first storage device, the second storage device, the third storage device, and the fourth storage device correspond to an on-board memory of the tele-presence robot, the edge device, a cloud server, and a web interface respectively.

10. The tele-presence robot as claimed in claim 7, wherein the knowledge associated with the executed task type is partitioned and stored based on at least one of (i) a specific application associated with the task type, (ii) an environment of operating the tele-presence robot (iii) a learning pattern, and (iv) an input obtained from one or more users.

11. The tele-presence robot as claimed in claim 10, wherein the learning pattern comprises
(a) an adherence to (i) the critical value, (ii) the specific application associated with the associated task type, (iii) the domain of the associated task type, (iv) the environment of operating the tele-presence robot, (v) the flag variable,
(b) a frequency of usage of the information being queried,
(c) the critical value being over-ridden,
(d) a response time of at least one of the first storage device, the second storage device, the third storage device, and the fourth storage device,
(e) a communication failure during dynamic querying of information by the tele-presence robot,
(f) a probability of the communication failure during an execution of a specific task type of the associated task type, and
(g) one or more log observations associated with an execution of the specific task type.

12. The tele-presence robot as claimed in claim 7, wherein the execution of the dynamically generated execution plan further comprises:
dynamically querying at least one of the first storage device, the second storage device, the third storage device, and the fourth storage device for further information; and
obtaining one or more associated responses thereof for the execution of the associated task type.

13. One or more non-transitory machine-readable information storage mediums comprising one or more instructions which when executed by one or more hardware processors cause knowledge partitioning for task execution by conversational tele-presence robots in a geographically separated environment by:
obtaining, via the one or more hardware processors of a tele-presence robot, a control command via an edge device from a master device associated with a user;
parsing the control command to determine a set of instructions and an associated task type to be executed;
dynamically querying, by the tele-presence robot, information from a first storage device, a second storage device, a third storage device and a fourth storage device, wherein
the dynamically querying of the information is based on the determined set of instructions and the associated task type,
the information comprises at least one of navigation information and task execution information, and
each of the first storage device, the second storage device, the third storage device, and the fourth storage device are sequentially queried further based on:
a response that is obtained from at least one of the first storage device, the second storage device, the third storage device, and the fourth storage device
an amount of the information that is available in each of the first storage device, the second storage device, the third storage device, and the fourth storage device
a priority flag set for each of the first storage device, the second storage device, the third storage device, and the fourth storage device, and
the priority flag is set to each of the first storage device, the second storage device, the third storage device, and the fourth storage device, based on context of task execution of the associated task type and an environment in which the tele-presence robot is executing a given task of the associated task type;
dynamically generating, by the tele-presence robot, an execution plan based on the obtained response and executing the dynamically generated execution plan thereof, wherein the step of the dynamically generated execution plan comprises executing one or more sub tasks specific with the associated task type;
upon the execution of the dynamically generated execution plan, validating the executed one or more sub tasks; and
partitioning knowledge associated with the one or more sub tasks and storing the partitioned knowledge in at least one of the first storage device, the second storage device, the third storage device, and the fourth storage device respectively for subsequent task execution, wherein the partitioning of the knowledge and the storing of the partitioned knowledge is based on:
a critical value assigned to at least one of the first storage device, the second storage device, the third storage device, and the fourth storage device, wherein the critical value indicates level of the partitioned knowledge,
a domain of the associated task type, and
a flag variable assigned to each of the first storage device, the second storage device, the third storage device, and the fourth storage device, wherein the flag variable indicates a battery status of each of the first storage device, the second storage device, the third storage device, and the fourth storage device.

14. The one or more non-transitory machine-readable information storage mediums of claim 13, wherein the obtained response is stored in partial or in full in at least one of the first storage device, the second storage device, the third storage device, and the fourth storage device.

15. The one or more non-transitory machine-readable information storage mediums of claim 13, wherein at least one of the first storage device, the second storage device, the third storage device and the fourth storage device correspond to an on-board memory of the tele-presence robot, the edge device, a cloud server and a web interface respectively.

16. The one or more non-transitory machine-readable information storage mediums of claim 13, wherein
partitioning knowledge associated with the executed task type and storing the partitioned knowledge is further based on at least one of (i) a specific application associated with the task type, (ii) an environment of operating the tele-presence robot (iii) a learning pattern, and (vii) an input obtained from one or more users, and
the learning pattern comprises
(a) an adherence to (i) the critical value, (ii) the specific application associated with the task type, (iii) the domain of the associated task type, (iv) the environment of operating the tele-presence robot, (v) the flag variable,
(b) a frequency of usage of the information being queried,
(c) the critical value being over-ridden,
(d) a response time of at least one of the first storage device, the second storage device, the third storage device, and the fourth storage device,
(e) a communication failure during dynamic querying of information by the tele-presence robot, (f) a probability of the communication failure during an execution of a specific task type of the associated task type, and (g) one or more log observations associated with an execution of the specific task type.

17. The one or more non-transitory machine-readable information storage mediums of claim 13, wherein the execution of the dynamically generated execution plan further comprises:

dynamically querying at least one of the first storage device, the second storage device, the third storage device and the fourth storage device for further information; and obtaining one or more associated responses for the execution of the one or more sub tasks.

* * * * *